US011630852B1

(12) United States Patent
Mondloch et al.

(10) Patent No.: US 11,630,852 B1
(45) Date of Patent: Apr. 18, 2023

(54) MACHINE LEARNING-BASED CLUSTERING MODEL TO CREATE AUDITABLE ENTITIES

(71) Applicant: Wells Fargo Bank, N.A., San Francisco, CA (US)

(72) Inventors: Tylor Christopher Mondloch, San Antonio, TX (US); Richard Penfil, II, San Antonio, TX (US); Brian Karp, Charlotte, NC (US); Corinne Elizabeth Larsen, Robbinsdale, MN (US); Jeremy Salden, San Francisco, CA (US); Kelley Lyn Impoco, Charlotte, NC (US); Jeremy Paynes, Lakeville, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 74 days.

(21) Appl. No.: 17/144,986

(22) Filed: Jan. 8, 2021

(51) Int. Cl.
*G06F 16/28* (2019.01)
*G06Q 30/02* (2012.01)
(Continued)

(52) U.S. Cl.
CPC ........ *G06F 16/285* (2019.01); *G06F 16/2282* (2019.01); *G06Q 10/06393* (2013.01);
(Continued)

(58) Field of Classification Search
CPC .. G06F 16/285; G06F 16/2282; G06F 16/287; G06Q 10/06393; G06Q 10/10;
(Continued)

(56) References Cited

U.S. PATENT DOCUMENTS 9,069,808 B2 * 6/2015 Kementsietsidis ......................... G06F 16/2228
9,477,937 B2 10/2016 Favre et al.
(Continued)

FOREIGN PATENT DOCUMENTS

CN 105739979 B 7/2016
CN 108628665 A 10/2018

OTHER PUBLICATIONS

Jung et al., "Workflow Clustering Method Based on Process Similarity", Computational Science and Its Applications, vol. 3981, May 2006, 11 pp.
(Continued)

*Primary Examiner* — Alford W Kindred
*Assistant Examiner* — Cecile H Vo
(74) *Attorney, Agent, or Firm* — Shumaker & Sieffert, P.A.

(57) ABSTRACT

Techniques are described for automatic creation of optimal auditable entities (AEs) using a machine learning (ML)-based clustering model. The clustering model, when executed on one or more computing devices within an audit system of a company, is configured to automatically cluster the company's business processes into AEs based on similarity analyses of business process attributes. More specifically, in some examples, the clustering model ingests business processes and their corresponding attributes from a database, automatically clusters together business processes to achieve maximum intra-cluster similarity scores, and outputs the final clusters as model AEs. The resulting model AEs may be used as functional units for internal audits of the company's business processes. The resulting model AEs may improve audit efficiency due to the model AEs including only highly similar business processes. In addition, the
(Continued)

resulting model AEs may enable more accurate assignment of audits based upon auditor experience and technical skills.

18 Claims, 10 Drawing Sheets

(51) Int. Cl.
*G06F 16/22* (2019.01)
*G06Q 30/0204* (2023.01)
*G06Q 10/10* (2023.01)
*G06Q 10/0639* (2023.01)
*G06N 20/00* (2019.01)
*G06Q 50/26* (2012.01)
*G06Q 30/018* (2023.01)

(52) U.S. Cl.
CPC ......... *G06Q 10/10* (2013.01); *G06Q 30/0205* (2013.01); *G06N 20/00* (2019.01); *G06Q 30/018* (2013.01); *G06Q 50/26* (2013.01)

(58) Field of Classification Search
CPC .. G06Q 30/0205; G06Q 30/018; G06Q 50/26; G06Q 10/06; G06Q 10/101; G06Q 10/103; G06Q 10/107; G06Q 10/1091; G06Q 10/1093; G06Q 10/1095; G06Q 10/1097; G06Q 30/0204; G06Q 50/265; G06N 20/00; G06N 20/20
See application file for complete search history.

(56) References Cited

U.S. PATENT DOCUMENTS

| | | |
|---|---|---|
| 2005/0071209 A1 | 3/2005 | Tatavu et al. |
| 2007/0021995 A1 | 1/2007 | Toklu et al. |
| 2010/0325054 A1 | 12/2010 | Currie et al. |
| 2013/0226639 A1 | 8/2013 | Yokoyama et al. |
| 2014/0129285 A1 | 5/2014 | Wu et al. |
| 2014/0129560 A1 | 5/2014 | Grokop et al. |
| 2014/0156623 A1 | 6/2014 | Guha et al. |
| 2014/0215495 A1 | 7/2014 | Erich et al. |
| 2014/0304027 A1 | 10/2014 | Wu et al. |
| 2015/0020048 A1* | 1/2015 | Misra ................. G06F 8/74 717/120 |
| 2017/0103441 A1* | 4/2017 | Kolb .................. G06F 16/951 |
| 2017/0371632 A1 | 12/2017 | Bullis et al. |
| 2017/0371715 A1 | 12/2017 | Bush, III et al. |
| 2019/0026634 A1 | 1/2019 | Homeyer et al. |
| 2019/0258976 A1 | 8/2019 | Parees et al. |

OTHER PUBLICATIONS

Ordoñez et al., "A business process clustering algorithm using incremental covering arrays to explore search space and balanced Bayesian information criterion to evaluate quality of solutions", PLoS One, Jun. 13, 2019, 27 pp.

Sarno et al., "Clustering of ERP Business Process Fragments", IEEE, Nov. 2013, 6 pp.

U.S. Appl. No. 17/185,617, filed Feb. 25, 2021, naming inventor Chan.

Kong et al., "Delta: a tool for representing and comparing workflows", Proceedings of the SIGCH I Conference on Human Factors in Computing Systems, May 2012, 10 pp.

* cited by examiner

80 →

| BP ID | Geographic Region | | | |
|---|---|---|---|---|

88

| BP ID | Product Types | | | |
|---|---|---|---|---|

86

| BP ID | Applications | | | |
|---|---|---|---|---|

84

| BP ID | Legal Entities | | | |
|---|---|---|---|---|

83

| BP ID | L2 | L3 | L4 | L5 |
|---|---|---|---|---|
| 1 | | | | |
| 2 | | | | |
| 3 | | | | |
| 4 | | | | |
| 5 | | | | |
| 6 | | | | |

| BP ID | MODEL AE ID |
|---|---|
| 1 | 1 |
| 2 | 1 |
| 3 | 1 |
| 4 | 2 |
| 5 | 2 |
| 6 | 2 |

MACHINE LEARNING-BASED CLUSTERING MODEL TO CREATE AUDITABLE ENTITIES

TECHNICAL FIELD

The disclosure relates to computing systems, and more specifically, computing systems executing machine learning models to perform data clustering.

BACKGROUND

Internal audits evaluate a company's internal controls, including its corporate governance and accounting processes. Internal audits ensure compliance with laws and regulations, help to maintain accurate and timely financial reporting and data collection, and help to attain operational efficiency by identifying problems and correcting lapses. Auditable entities (AEs) may serve as the functional units for internal audits. In the case of vertical audits, the AEs may each include a set of related business processes from within the same division of the company. An internal audit department within the company may rely on the AEs manually assembled by individuals or agents within the division to assign auditors to and perform audits of the business processes included within the AEs. The internal audit department may also qualitatively audit the manual assembly of the AEs themselves.

SUMMARY

In general, this disclosure describes techniques for automatic creation of optimal auditable entities (AEs) using a machine learning (ML)-based clustering model. The clustering model, when executed on one or more computing devices within an audit system of a company, is configured to automatically cluster the company's business processes into AEs based on similarity analyses of business process attributes. More specifically, in some examples, the clustering model ingests business processes and their corresponding attributes from a database, automatically clusters together business processes to achieve maximum intra-cluster similarity scores, and outputs the final clusters as model AEs. The resulting model AEs may be used as functional units for internal audits of the company's business processes. The resulting model AEs may improve audit efficiency due to the model AEs including only highly similar business processes. In addition, the resulting model AEs may enable more accurate assignment of audits based upon auditor experience and technical skills.

Conventionally, AEs are assembled manually by individuals or agents of the company (referred to herein as "agent AEs"), and quality control processes associated with the manual AE assembly process are typically qualitative. The clustering model disclosed herein utilizes quantitative approaches to assembling AEs and, thus, the resulting model AEs may be the basis for well-defined, scientific credible challenges to the agent AEs. In some examples, the audit system of the company may perform comparisons between the model AEs and agent AEs, and output data representative of user interface dashboards used to present reports of comparison data to the agents.

In one example, this disclosure is directed to a method comprising receiving, by a computing system and from a database, data representative of a plurality of business processes, the data including a business process identifier and a set of attributes for each business process of the plurality of business processes; and calculating, by the computing system, similarity values for each business process to all other business processes, wherein calculating the similarity values for a respective business process comprises: comparing each attribute in the set of attributes for the respective business process to attributes for each of the other business processes, and quantifying an amount of similarity of the respective business process to each of the other business processes based on a direction of the comparison. The method further comprises creating, by the computing system, clusters of business processes, each cluster including one or more business processes, wherein the clusters achieve intra-cluster similarity scores based on the similarity values for the one or more business processes included in each cluster; and outputting, by the computing system, a mapping of each cluster of the one or more clusters to the one or more business processes included in the respective cluster.

In another example, this disclosure is directed to a computing system comprising a memory; and one or more processors in communication with the memory. The one or more processors are configured to receive, from a database, data representative of a plurality of business processes, the data including a business process identifier and a set of attributes for each business process of the plurality of business processes; and calculate similarity values for each business process to all other business processes, wherein to calculate the similarity values for a respective business process, the one or more processors are configured to: compare each attribute in the set of attributes for the respective business process to attributes for each of the other business processes, and quantify an amount of similarity of the respective business process to each of the other business processes based on a direction of the comparison. The one or more processors are further configured to create clusters of business processes, each cluster including one or more business processes, wherein the clusters achieve intra-cluster similarity scores based on the similarity values for the one or more business processes included in each cluster; and output a mapping of each cluster of the one or more clusters to the one or more business processes included in the respective cluster.

In a further example, this disclosure is directed to a computer-readable storage medium storing instructions that, when executed, cause one or more programmable processors to receive, from a database, data representative of a plurality of business processes, the data including a business process identifier and a set of attributes for each business process of the plurality of business processes; and calculate similarity values for each business process to all other business processes, wherein to calculate the similarity values for a respective business process, the instructions cause the one or more programmable processors to: compare each attribute in the set of attributes for the respective business process to attributes for each of the other business processes, and quantify an amount of similarity of the respective business process to each of the other business processes based on a direction of the comparison. The instructions further cause the one or more programmable processors to create clusters of business processes, each cluster including one or more business processes, wherein the clusters achieve intra-cluster similarity scores based on the similarity values for the one or more business processes included in each cluster; and output a mapping of each cluster of the one or more clusters to the one or more business processes included in the respective cluster.

The details of one or more examples of the disclosure are set forth in the accompanying drawings and the description

BRIEF DESCRIPTION OF DRAWINGS

FIG. 4A is a conceptual diagram illustrating a simplistic example of a collection of tables of business process attributes represented in a relational database as input to a business process clustering model, in accordance with techniques of this disclosure.

FIG. 4B is a conceptual diagram illustrating an example table of business processes IDs and model AE IDs output from a business process clustering model, in accordance with techniques of this disclosure.

FIGS. 5A-5D illustrate example user interface dashboards generated by an audit system for display on one or more agent devices, in accordance with the techniques of this disclosure.

DETAILED DESCRIPTION

Figure 1:
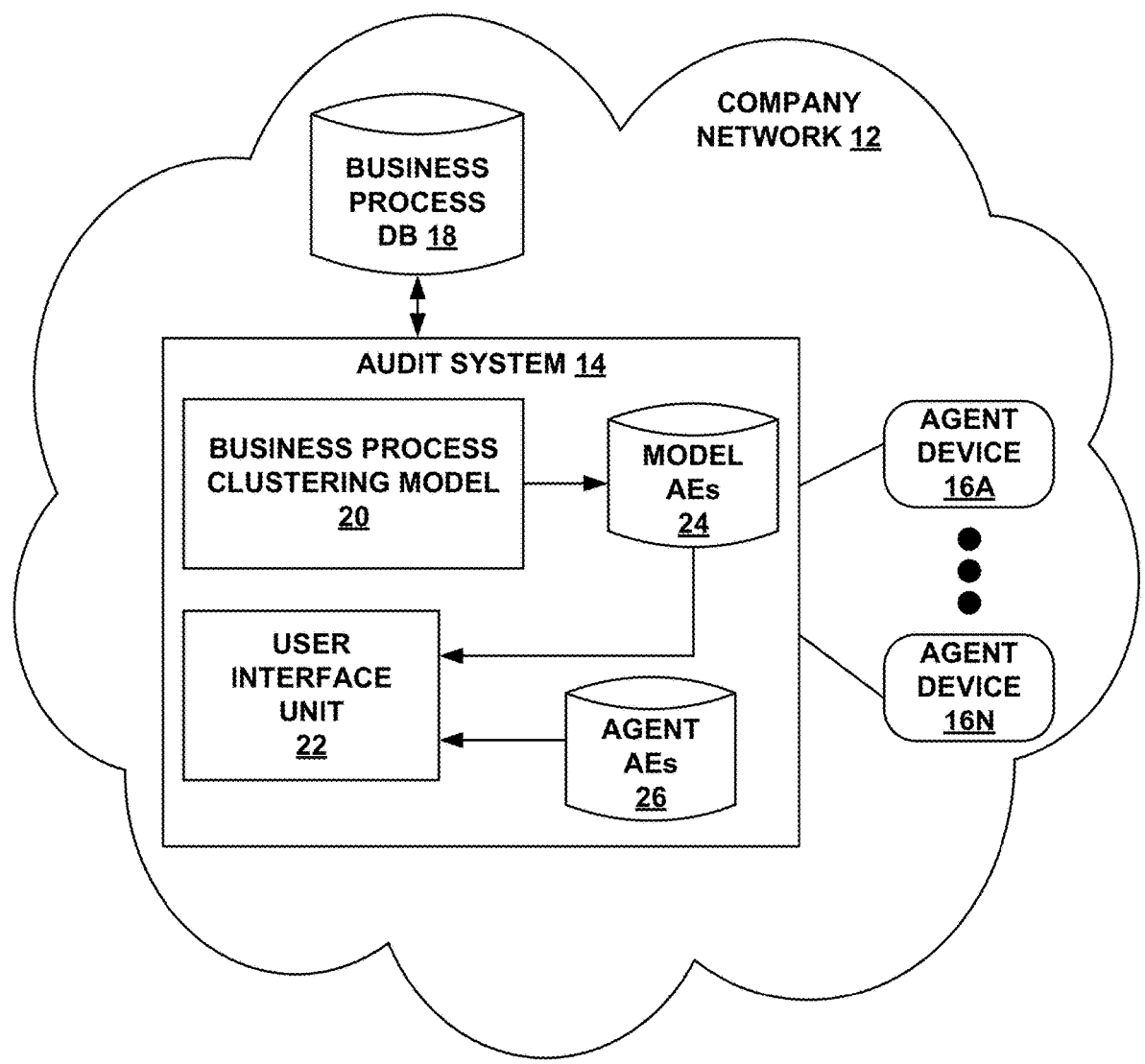
FIG. 1 is a block diagram illustrating an example company network including an audit system having one or more computing devices executing a business process clustering model, in accordance with techniques of this disclosure.

FIG. 1 is a block diagram illustrating an example company network 12 including an audit system 14 having one or more computing devices executing a business process clustering model 20, in accordance with techniques of this disclosure. In the example illustrated, business process clustering model 20 is configured to ingest business processes and their corresponding attributes from business process database 18, automatically cluster together business processes to achieve a maximum similarity score, and output the final clusters as model auditable entities (AEs) 24.

Company network 12 may comprise a private network including, for example, a private network associated with an organization, enterprise, business, or company, such as a financial institution. Company network 12 may comprise a centralized or distributed network of computing systems made up of interconnected desktop computers, laptops, workstations, wireless devices, network-ready appliances, file servers, print servers, or other computing devices. For example, company network 12 may be accessible to users via user computing devices, e.g., agent devices 16, that are either locally connected or remotely connected via one or more wireless and/or wired networks (e.g., a wide area network (WAN), a local area network (LAN), or a virtual private network (VPN). Although illustrated as a single entity, computer network 12 may comprise a combination of multiple networks.

The components within company network 12, illustrated in FIG. 1, may comprise one or more physical or virtual components. For instance, in various examples, a device or system shown in FIG. 1 may comprise a physical entity (e.g., a computing device, a computer server, a quantum computer, a desktop computer, a tablet computer, a laptop computer, a smartphone, etc.) and/or virtual entity (e.g., virtual machine, application software in a computing machine, cloud computing system, etc.). In certain examples, a device or system may include one or more computers that process information and/or devices with embedded computers.

Audit system 14 may include one or more computing devices executing business process clustering model 20 and user interface unit 22. For example, audit system 14 may include a plurality of servers configured to provide internal audit services to divisions of the company. The divisions of the company may be defined according to the company's divisional hierarchy structure. Audit system 14 may be interconnected with a plurality of databases and other storage facilities in which business processes and their corresponding attributes for the divisions are stored, e.g., business process database 18. In the illustrated example of FIG. 1, audit system 14 includes business process clustering model 20 configured to perform the automatic clustering of business processes and creation of model AEs 24 used for internal audits of the company's business processes. Audit system 14 also includes user interface unit 22 configured to analyze model AEs 24 and agent AEs 26, and generate one or more reports based on the analysis for presentation as user interface dashboards on agent devices 16.

Business process database 18 may be a data structure for storing data related to business processes, including corresponding business process attributes, for one or more divisions of the company. As one example, for a given business process, the business process attributes may include the divisional hierarchy levels (e.g., business group, line-of-business (LOB), standard and/or detailed business unit (BU), etc.) used to define the division of the business process, the legal entities encompassed by the business process, the applications encompassed by the business process, the classification or types of the products encompassed by the business process, and the geographic areas or regions in which the business process is utilized.

Although illustrated as a single database, in other examples business process database 18 may comprise any suitable number of databases used for storing the business process data. In some examples, business process databases 18 may be a relational database that organizes the business process attributes into a collection of tables that are related based on common business process identifiers (IDs). Business process database 18 may be stored and maintained by the company within company network 12, as illustrated in FIG. 1. In other examples, business process database 18 may be stored external to company network 12 and be securely accessible by computing systems and devices, e.g., audit system 14 and/or agent devices 16, within company network 12. Although shown as being separate from audit system 14, in certain examples, business process database 18 may be stored and maintained within audit system 14.

Agents of the company may comprise employees or other team members within the different divisions of the company, including auditors within an internal audit department of the company. The agents may use agent devices 16 to interact with audit system 14, e.g., via user interface unit 22. In addition, a select group of agents having appropriate permissions may use agent devices 16 to add, remove, or modify their respective divisions' business processes and corresponding attributes stored in business process database 18. Agent devices 16 may be any type of computing device (e.g., a mobile smartphone, a tablet computer, a personal digital assistant (PDA), a laptop computer, a portable gaming device, a portable media player, a wearable computing device), and may communicate with audit system 14 via company network 12.

Auditors within the internal audit department of the company may perform internal audits to evaluate the company's internal controls, including its corporate governance and accounting processes. Internal audits ensure compliance with laws and regulations, help to maintain accurate and timely financial reporting and data collection, and help to attain operational efficiency by identifying problems and correcting lapses. Auditable entities (AEs) may serve as the functional units for internal audits. Vertical AEs may each include a set of related business processes from within the same division of the company. On the other hand, horizontal AEs each include a set of related business processes that span multiple divisions. In general, the model and agent AEs described in this disclosure should be understood to be vertical AEs.

Agents within each division of the company may generate their business processes and manually assemble the business processes into one or more agent AEs 26. In general, however, there are no limitations or strictly-defined set of logic that serves as a basis for how agent AEs 26 are assembled. As such, each of agent AEs 26 may include any number of business processes with varying degrees of similarity. Although the assembly of a particular agent AEs may make sense from the perspective of the division agents that performed the manual assembly, the set of business processes within the particular agent AE may not be conducive to efficient internal audits or efficient audit planning. In addition, quality control processes associated with the manual AE assembly process are typically inherently qualitative.

According to the techniques described in this disclosure, business process clustering model 20 is configured to automatically cluster the company's business processes into model AEs 24 based on similarity analyses of business process attributes queried from business process database 18. More specifically, upon receipt of the business process attributes from business process database 18 as strings, business process clustering model 20 factorizes each attribute in a set of attributes for a given business process such that unique values of attributes are converted into unique strings. The attribute-level based factorization enables similarity comparisons to be performed between individual attributes of different business processes instead of between lists or sets of attributes of the business processes.

Business process clustering model 20 then classifies the business processes into groups based on the divisional hierarchy level attributes that define the divisions of the business processes, where each group includes business processes associated with a respective division. Within a given group, business process clustering model 20 calculates similarity values for each of the business processes to all other of the business processes based on an attribute-level comparison and quantification of an amount of similarity between the attributes of the business processes with respect to a direction of the comparison. The calculated similarity values may be stored in a bi-directional similarity matrix for the given group.

Business process clustering model 20 creates clusters of the business processes included in the given group such that the clusters achieve desired intra-cluster similarity scores based on the similarity values for the business processes included in each cluster. In some examples, "desired" intra-cluster similarity scores may correspond to high, sufficiently high, or maximum intra-cluster similarity scores based on the similarity values for the business processes included in each cluster. For example, business process clustering model 20 initially creates the clusters of business processes randomly, and then systematically considers each possible move or swap of business processes between the clusters and commits the considered swaps that result in a net gain to the intra-cluster similarity scores for the clusters. Business process clustering model 20 performs the iterative process of considering and committing swaps of business processes between the clusters based on each modified cluster arrangement until no additional swaps of business processes between clusters would further improve the intra-cluster similarity scores for the clusters. The final arrangement of business processes among the clusters included in the given group, in such an example, is the arrangement that achieves the maximum intra-cluster similarity scores for the clusters.

Business process clustering model 20 outputs the final clusters in the given group as a mapping of each cluster to the one or more business processes included in the respective cluster. The final clusters in the given group may be output as model AEs 24 for that group or division of the company. Business process clustering model 20 may assign a unique model AE ID to each of the final clusters. The output of business process clustering model 20 may be in the form of a table that maps a model AE ID of each of the final clusters to one or more business process IDs of the one or more business processes included in the respective final cluster. The business processes mapped to a given model AE ID are considered to be included in the identified model AE.

Model AEs 24 may be used as functional units for internal audits of the company's business processes. Model AEs 24 may improve audit efficiency based on the inclusion of only highly similar business processes within each model AE. In addition, model AEs 24 may enable more efficient audit planning, including more accurate assignment of audits based upon auditor experience and technical skills. Furthermore, because business process clustering model 20 utilizes quantitative approaches to assembling AEs, model AEs 24 may be used as the basis for well-defined, scientific credible challenges to agent AEs 26.

In the example of model AEs 24 being used for credible challenges to agent AEs 26, user interface unit 22 is configured to perform comparisons between model AEs 24 and agent AEs 26 created for a same division of the company. User interface unit 22 may further generate one or more reports based on the comparisons and output data representative of user interface dashboards used to present the reports on agent devices 16. In some examples, the reports may illustrate the differences between how the business processes of a division are assembled into one or more model AEs 24, and how the same business processes were assembled into one more agent AEs 26. In other examples, the reports may illustrate a number of model AEs 24 that were created by business process clustering model 20 compared to a number of agent AEs 26 that were created for the same group of business processes of a division. In some examples, the agents may use the reports generated by user interface unit 20 to inform how to create and/or modify agent AEs 26 for their respective divisions.

Figure 2:
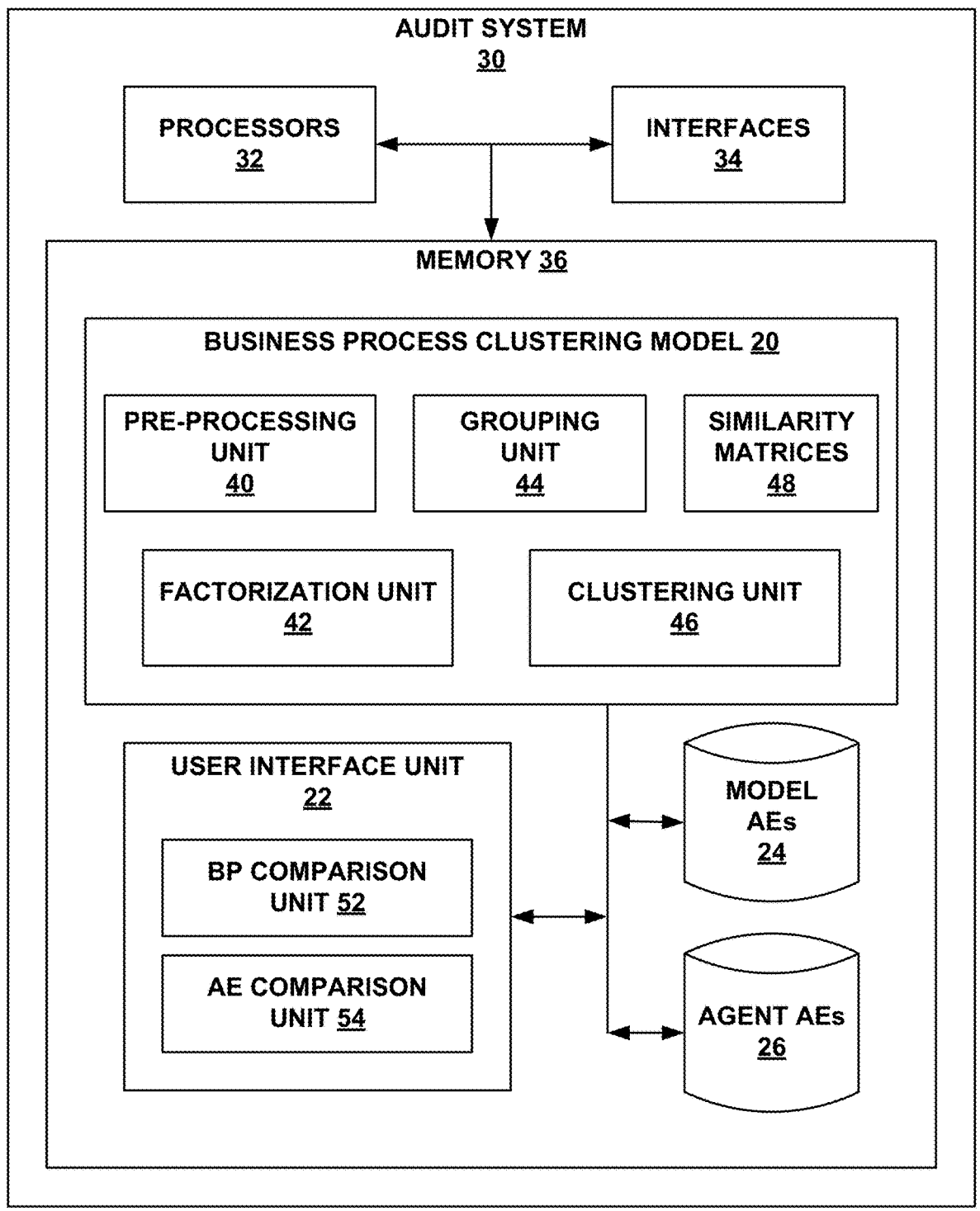
FIG. 2 is a block diagram illustrating an example audit system executing a business process clustering model, in accordance with techniques of this disclosure.

FIG. 2 is a block diagram illustrating an example audit system 30 executing business process clustering model 20, in accordance with techniques of this disclosure. Audit system 30 shown in FIG. 2 may be one example of audit system 14 of FIG. 1.

Audit system 30 may be implemented as any suitable computing device, machine, or system, such as one or more server computers, workstations, mainframes, appliances, cloud computing systems, and/or other computing systems that may be capable of performing operations and/or functions described in accordance with one or more aspects of the present disclosure. In some examples, audit system 30 may comprise one or more physical entities, while in other examples, it may comprise one or more virtual entities (e.g., virtual machines). FIG. 2 illustrates only one particular example of audit system 30. Many other examples of audit system 30 may be used in other instances and may include a subset of the components shown in FIG. 2 or additional components not shown in FIG. 2.

In the illustrated example of FIG. 2, audit system 30 includes one or more processors 32, one or more interfaces 34, and one or more memory units 36. Memory 36 of audit system 30 may also store an operating system (not shown) executable by processors 32 to control the operation of components of audit system 30. Communication channels may interconnect each of the components for inter-component communications (physically, communicatively, and/or operatively). In some examples, the communication channels may include a system bus, a network connection, an inter-process communication data structure, or any other method for communicating data between hardware and/or software.

Audit system 30 includes one or more processors 32 that may implement functionality and/or execute instructions within audit system 30. For example, processors 32 may receive and execute instructions stored by memory 36 that execute the functionality of the elements and/or modules described herein. These instructions executed by processors 32 may cause audit system 30 to store information within memory 36 during program execution. Processors 32 may also execute instructions of the operating system stored by memory 36 to perform one or more operations described herein. Processors 32 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Interfaces 34 of audit system 30 may communicate with one or more other devices via one or more networks by transmitting and/or receiving network signals on the one or more networks. Examples of interfaces 34 include a network interface card (e.g., such as an Ethernet card), an optical transceiver, a radio frequency transceiver, or any other type of device that can send and/or receive information, such as through a wired or wireless network. Other examples of interfaces 34 may include short wave radios, cellular data radios, wireless Ethernet network radios, as well as universal serial bus (USB) controllers.

In some examples, interfaces 34 of audit system 30 may operate as input and/or output devices. Examples of input are tactile, audio, and video input. Examples of interfaces 34 configured to receive input include a presence-sensitive screen, touch-sensitive screen, mouse, keyboard, voice responsive system, video camera, microphone, or any other type of device for detecting input from a human or machine. Examples of output are tactile, audio, and video output. Examples of interfaces 34 configured to generate output include a presence-sensitive screen, sound card, video graphics adapter card, speaker, cathode ray tube (CRT) monitor, liquid crystal display (LCD), or any other type of device for generating output to a human or machine.

One or more memory units 36 ("memory 36") within audit system 30 may store information for processing during operation of audit system 30 (e.g., audit system 30 may store data accessed by one or more modules, processes, applications, or the like during execution). In some examples, memory 36 of audit system 30 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art. In some cases, memory 36 may include redundant array of independent disks (RAID) configurations and one or more solid-state drives (SSDs).

Memory 36, in some examples, also include one or more computer-readable storage media. Memory 36 may be configured to store larger amounts of information than volatile memory. Memory 36 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Memory 36 may store program instructions and/or data associated with one or more software/firmware elements or modules. In the illustrated example of FIG. 2, memory 36 may store instructions and/or data associated with business process clustering model 20, user interface unit 22, model AEs 24, and agent AEs 26. These may be examples of similarly named components shown in FIG. 1.

In the example of FIG. 2, business process clustering model 20 includes pre-processing unit 40, factorization unit 42, grouping unit 44, clustering unit 46, and similarity matrices 48. Business process clustering model 20 is configured to automatically cluster business processes into model AEs 24 based on similarity analyses of business process attributes queried from a database, such as business process database 18 of FIG. 1 or relational database 80 of FIG. 4A.

Business process clustering model 20 queries sets of attributes for each of a plurality of business processes from the database in the form of strings. Pre-processing unit 40 pre-processes the strings to remove formatting discrepancies, such as capitalization and spacing discrepancies. Factorization unit 42 then performs factorization at an attribute level such that each unique attribute value is converted in a unique attribute string. The attribute-level based factorization enables similarity comparisons to be performed between individual attributes of different business processes instead of between lists or sets of attributes of the business processes.

Grouping unit 44 classifies business processes into groups based on divisional hierarchy level attributes that define divisions of the business processes. For example, the divisional hierarchy level attributes for each of the business processes indicate at least L2 (e.g., business group) and L3 (e.g., line of business (LOB)) hierarchy levels for the respective business process. Grouping unit 44 creates groups where each group includes business processes having the same L2 and L3 hierarchy levels. In this way, grouping unit 44 ensures that any model AEs created within each of the groups are vertical AEs that may be used for vertical audits of the business processes included in the same division, as defined by the L2 and L3 hierarchy levels.

Within a given group, clustering unit 46 calculates similarity values for each of the business processes to all other of the business processes based on an attribute-level comparison and quantification of an amount of similarity between the attributes of the business processes with respect to a direction of the comparison. In some examples, the similarity values may be referred to as "bi-directional" similarity values as the similarity values between two business processes may be different based on the direction of the comparison. The calculated similarity values may be stored in memory 36 as a bi-directional similarity matrix 48 for the given group.

Similarity matrix 48 may comprise rows of business process (BP) IDs of the business processes included in the given group and columns of the same BP IDs. Each cell of similarity matrix 48 includes a similarity value between attributes of a business process indicated by the row BP ID and attributes of a business process indicated by the column BP ID in the direction from the row BP ID to the column BP ID. For example, a first cell corresponding to a row BP ID of "1" and a column BP ID of "2" may include a similarity value from attributes of BP ID 1 to attributes of BP ID 2. BP ID 1 may include three attributes and BP ID 2 may include five attributes. In this example, the comparison of each attribute of BP ID 1 to each attribute of BP ID 2 may result in a similarity percentage of 1 or 100% if the three BP ID 1 attributes are the same as attributes of BP ID 2. Conversely, a second cell corresponding to a row BP ID of "2" and a column BP ID of "1" may include a similarity value from attributes of BP ID 2 to attributes of BP ID 1. The comparison of each attribute of BP ID 2 to each attribute of BP ID 1 may result in a similarity percentage of 0.6 or 60% if three of the five BP ID 2 attributes are the same as the three attributes of BP ID 1. The cells along the diagonal of similarity matrix 48 comprise self-comparisons and should be equal to 1.

In some cases, clustering unit 46 may take a weighted significance of each type of attribute into account when calculating the similarity values for inclusion in similarity matrix 48 for the given group. For example, to calculate the similarity value from a first business process to a second business process, clustering unit 46 may, for each attribute of the first business process, multiply the similarity percentage by the weighted significance for the type of the respective attribute, and then may compute the sum across all attributes of the first business process. In one particular example, the divisional hierarchy level is the most significant attribute, followed by legal entities, applications, product types, and geographic region, in descending order of significance. The order of significance may be reflected in the weighted significance values applied to each type of attribute when calculating the similarity values.

Clustering unit 46 also creates clusters of the business processes included in the given group such that the clusters achieve, in some examples, maximum intra-cluster similarity scores based on the similarity values for the business processes included in each cluster. For example, clustering unit 46 initially creates the clusters of business processes, and then systematically considers each possible move or swap of business processes between the clusters. Clustering unit 46 commits any considered swaps that result in a net gain to the intra-cluster similarity scores for the clusters. Clustering unit 46 performs the iterative process of considering and committing swaps of business processes between the clusters based on each modified cluster arrangement until no additional swaps of business processes between clusters would further improve the intra-cluster similarity scores for the clusters. In this way, clustering unit 46 determines that the final arrangement of business processes among the clusters included in the given group is the arrangement that achieves the maximum intra-cluster similarity scores for the clusters.

In some examples, clustering unit 46 randomly creates the initial clusters of business processes such that each cluster includes a preset number (e.g., N=12) of randomly selected business processes. In cases where the total number of business processes is not divisible by the preset number, then one of the initial clusters will include less than the present number of business processes. The preset number of business processes for inclusion in each cluster may be selected based on an ideal number of hours to perform a vertical audit of the business processes included in the cluster. As one example, if an ideal number of hours to perform a vertical audit is 1200 hours then the number of business processes included in that audit is a maximum of 12 business processes. In other examples, the preset number of business processes may be selected or set according to different considerations.

In still other examples, instead of randomly creating the initial clusters, clustering unit 46 may attempt to create the "best possible" initial clusters (i.e., clusters having the highest intra-cluster similarity scores) based on similarity matrix 48 for the given group. However, any benefit gained from potentially reducing the number of iterations or swaps performed when staring from the "best possible" initial clusters, may be offset by the additional processing power required to identify the "best possible" initial clusters.

Business process clustering model 20 outputs the final clusters in the given group as model AEs 24. In some examples, model AEs 24 may be in the form of a table, e.g., table 90 of FIG. 4B, that maps a model AE ID of each of the final clusters to one or more BP IDs of the one or more business processes included in the respective final cluster. Model AEs 24 may be used as functional units for internal vertical audits of the business processes included in each of the model AEs. Model AEs 24 may further be used to facilitate more efficient audit planning, including more accurate assignment of audits based upon auditor experience and technical skills.

In the example of FIG. 2, user interface unit 22 includes BP comparison unit 52 and AE comparison unit 54. In scenarios where model AEs 24 are used for credible challenges to agent AEs 26, user interface unit 22 is configured to perform comparisons between model AEs 24 and agent AEs 26 created for a same division and comparisons between the business processes included in the model AEs 24 and agent AEs 26. User interface unit 22 may generate one or more reports based on the comparisons and output data representative of user interface dashboards used to present the reports. In some examples, BP comparison unit 52 may generate reports that illustrate the differences between how the business processes of a division are assembled into one or more model AEs 24, and how the same business processes were assembled into one more agent AEs 26. In other examples, AE comparison unit 53 may generate reports that illustrate a number of model AEs 24 that were created by business process clustering model 20 compared to a number of agent AEs 26 that were created for the same group of business processes of a division.

Figure 3:
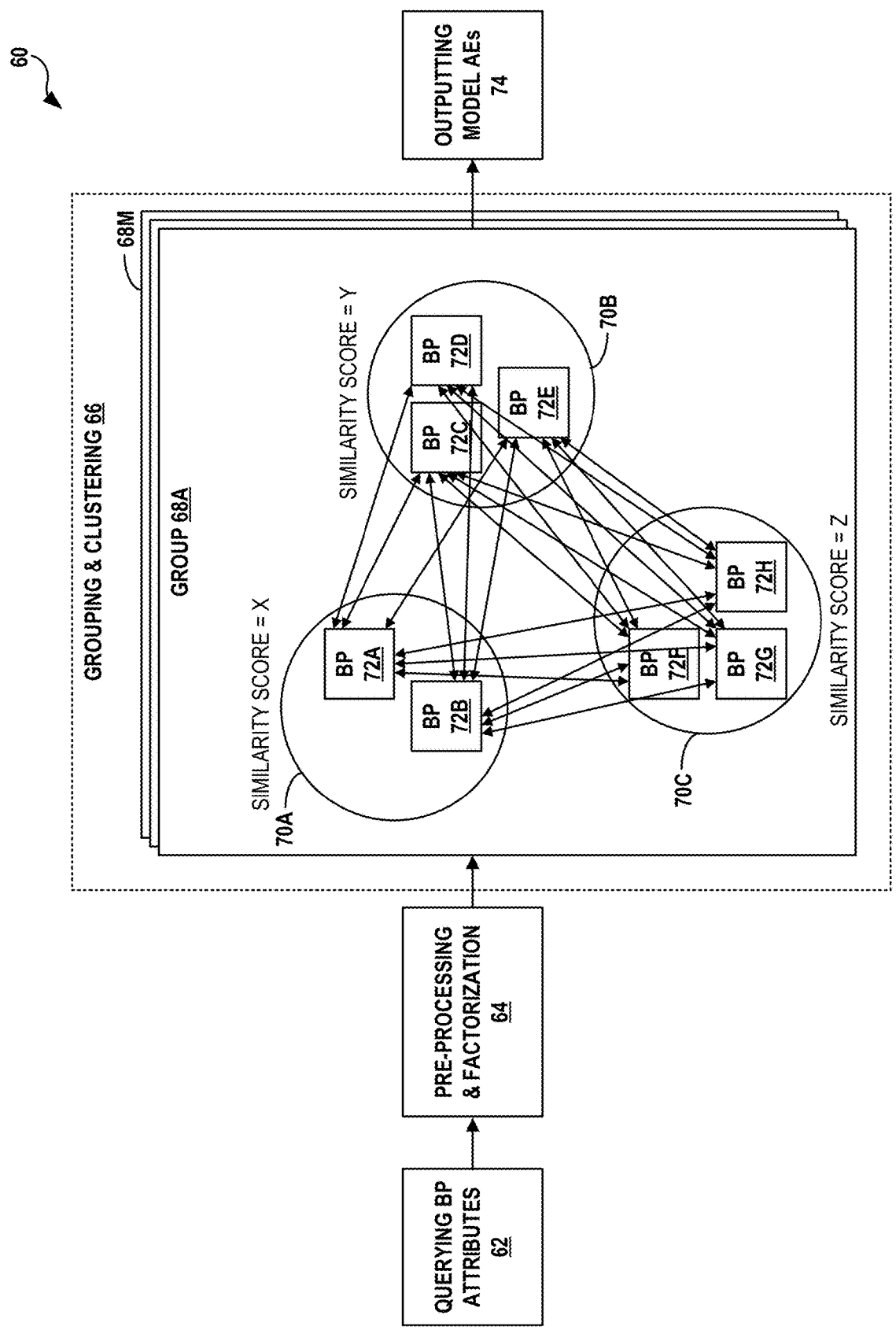
FIG. 3 is a conceptual diagram illustrating an example processing flow of a business process cluster model, in accordance with techniques of this disclosure.

FIG. 3 is a conceptual diagram illustrating an example processing flow 60 of a business process clustering model, e.g., business process clustering model 20 of FIGS. 1 and 2, in accordance with techniques of this disclosure. The business process clustering model receives business process attributes as input, and the business process clustering model outputs model AEs as clusters of business processes.

Model AEs, e.g., model AEs 24 of FIGS. 1 and 2, may serve as functionals unit for internal, vertical audits. Horizontal audits entail auditing of business processes across multiple divisions of a company and may be thought of as "special" audits. The model described herein is not intended to create horizontal AEs. Vertical audits, on the other hand, entail auditing of multiple, related business processes that are typically from within the same division. The business process clustering model described herein is configured to assemble business processes into an AE for a vertical audit based upon various attributes of the business processes. In one example, a divisional hierarchy level of a business process is the most significant consideration, followed by legal entities, applications, product types, and geographic region in descending order of significance. The descending order of significance may be reflected in similarity calculations performed by the model when assembling AEs.

The business process clustering model may be built using machine learning techniques with a base model that is based on a custom clustering algorithm. Potential alternative algorithms explored for use in the model included K-means clustering and decision trees. In the current example, K-means clustering was not used due to there being no set number of AEs; rather, the number of business processes within an AE serves as the constraint, by policy. In addition, in the current example, decisions trees were not used due to a determination that the model should not utilize manually-assembled AEs (i.e., agent AEs) as a basis for model supervision. Although the manual-assembled AEs exist, no strictly-defined set of logic serves as the basis for their creation by the human agents. Thus, the manually-assembled AEs were determined to be unsuitable for utilization as a training dataset. In other examples and in different scenarios, either k-means clustering or decisions trees may be used to create a business process clustering model.

As illustrated in FIG. 3, the model framework includes five steps or stages. As a first stage, the business process clustering model extracts or queries the business processes from a source database, e.g., business process database 18 of FIG. 1 or relational database 80 of FIG. 4A, that includes key attributes of the business processes (62). Any business process encompassed by a horizontal AE may be identified by its attributes and removed upon receipt. In some examples described herein, the key attributes include divisional hierarchy level 2 (e.g., business group), divisional hierarchy level 3 (e.g., line of business (LOB)), divisional hierarchy level 4 (e.g., standard business unit), divisional hierarchy level 5 (e.g., detailed business unit), legal entities, applications, product types, and geographies. As part of the first stage, the business process clustering model may also pre-process and factorize the strings received from the database (64). In general, the first stage prepares the business processes for attribute-level comparisons and similarity calculations in the later stages.

The business process clustering model next groups and clusters the business processes based on similarity analyses of the attributes of the business processes (66). As a second stage, the business process clustering model classifies the business processes into groups 68A-68M (collectively, "groups 68") based on values for the divisional hierarchy level 2 and 3 attributes of the business processes. For example, each of groups 68 may include business processes that have the same L2 and L3 attributes and, thus, belong to the same division. The second stage, thus, ensures that the AEs assembled within each group 68 comprise virtual AEs for use as functionals unit for vertical audits.

As a third stage, within each of groups 68, the business process clustering model calculates similarity values for each business process to all the other business processes within the same group. The similarity values are calculated at an attribute-level based on a direction of the comparison and, in some cases, a weighted significance of each attribute. As a fourth stage, within each of groups 68, the business process clustering model creates clusters that achieve a desired intra-cluster similarity score (e.g., a high, sufficiently high, or maximum intra-cluster similarity score) based on the similarity values for the business processes included in each cluster.

As illustrated in FIG. 3, within a given group 68A, the business process clustering model creates clusters 70A-70C (collectively "clusters 70") with each of the clusters 70 including one or more business processes 72A-72H (collectively "business processes 72"). Each of the clusters 70 has an intra-cluster similarity score that is equal to a sum of the similarity values for the business processes 72 included in each cluster. As shown, cluster 70A includes BP 72A and BP 72B, and has an intra-cluster similarity score equal to "X." Cluster 70B includes BP 72C, BP 72D, and BP 72E, and has an intra-cluster similarity score equal to "Y." Cluster 70C includes BP 72F, BP 72G, and BP 72H, and has an intra-cluster similarity score equal to "Z."

The illustrated arrows between each of BPs 72 indicate each possible move or swap of BPs 72 between clusters 70. The business process clustering model considers each of the possible swaps and commits those swaps that result in a net gain to intra-cluster similarity scores X, Y, and Z for clusters 70. For example, if a swap of BP 72A in cluster 70A with BP 72D in cluster 70B would cause both the similarity score for cluster 70A to increase and the similarity score for cluster 70B to increase, then the swap would be committed. As another example, if a swap of BP 72A in cluster 70A with BP 72D in cluster 70B would cause the similarity score for cluster 70A to increase but would cause the similarity score for cluster 70B to decrease, then the swap would only be committed if the overall change in similarity scores across both clusters 70A and 70B is positive or a net gain to the intra-cluster similarity scores. Each time a swap is committed, the arrangement of BPs 72 among clusters 70 changes. The business process clustering model then recalculates or reconsiders each possible move or swap of BPs 72 based on the modified cluster arrangement. The process continues until the business process clustering model determines that no additional swaps of BPs 72 between clusters 70 would further improve intra-cluster similarity scores X, Y, and Z for clusters 70.

As a fifth stage, the business process clustering model outputs the final clusters within each of the groups 68A-68M as model AEs (74). The business process clustering model may assign a unique AE ID for each of final clusters 70. The AE ID or cluster ID may comprise a dependent variable defined by the business process clustering model based on the above described similarity calculations. In some examples, the AE ID or cluster ID of a final cluster may be included as a business process attribute for each BP included in the final cluster. The business process clustering model may output the model AEs in the form of a many-to-one table mapping BP IDs of BPs 72 included in each of final clusters 70 to the model AE ID assigned to each of final clusters 70, such as table 90 of FIG. 4B.

The business process clustering model described herein automatically creates model AEs within a given division of a company based on business processes and their corresponding attributes. The model described herein is built using machine learning techniques using a custom clustering algorithm. In some examples, the model may be written in Python. Development of a model, as opposed to a simple automation, was necessary due to a need to introduce a level of uncertainty into the construction of the AEs. The assembly of business processes into AEs without introducing uncertainty would entail assessing all possible combinations of business processes in order to find the best or optimal AEs. In some examples, however, the count of business processes within a given group or division may be as high as 1100 such that assessing all possible combinations is not feasible as the assessment would be on the order of septillions of calculations. The business process clustering model described herein introduces uncertainty via a large sampling of possible combinations, with added safeguards. The model-based approach described herein results in an achievable runtime in production on the order of hours.

FIG. 4A is a conceptual diagram illustrating a simplistic example of a collection of tables 82-88 of business process attributes represented in a relational database 80 as input to a business process clustering model, in accordance with techniques of this disclosure. In some examples, relational database 80 may be substantially similar to business process database 18 from FIG. 1.

In the illustrated example of FIG. 4A, relational database 80 organizes the business process attributes into collection of tables 82-88 that are related based on common business process IDs included in the BP ID column in each of tables 82-88. As described in detail above, a business process clustering model (e.g., business process clustering model 20 from FIGS. 1 and 2) may query attributes for a plurality of business processes from relational database 80 based on the BP IDs of the plurality of business processes.

Relational database 80 stores key attributes for business processes of one or more divisions of a company. In the example of FIG. 4A, relational database 80 includes a divisional hierarchy level table 82 that stores L2, L3, L4, and L5 hierarchy levels for each BP ID used to define the division of each business process. The L2 hierarchy level may indicate a business group within a company, the L3 hierarchy level may indicate a line-of-business (LOB) within the L2 business group, the L4 hierarchy level may indicate a standard business unit (BU) within the LOB, and the L5 hierarchy level may indicate a detailed BU within the standard BU. In other examples, relational database 80 may organize the divisional hierarchy levels into multiple tables with each table storing a distinct divisional hierarchy level attribute.

Returning to the example of FIG. 4A, relational database 80 includes a legal entities table 83 that stores the legal entities encompassed by each BP ID. Relational database 80 includes an applications table 84 that stores the applications encompassed by each BP ID. Relational database 80 also includes a product types table 86 that stores the classification or types of the products encompassed by each BP ID. Relational database 80 further includes a geographical region table 88 that stores the geographic areas or regions in which each BP ID is utilized. In other examples, relational database 80 may include more or fewer attributes organized into more or fewer tables.

FIG. 4B is a conceptual diagram illustrating an example table 90 of business processes IDs and model AE IDs output from a business process clustering model, in accordance with techniques of this disclosure. In some examples, table 90 may be substantially similar to model AEs 24 of FIGS. 1 and 2 or model AEs 74 of FIG. 3.

As described in detail above, a business process clustering model (e.g., business process clustering model 20 from FIGS. 1 and 2) outputs final clusters within each group or division as a mapping of each cluster to one or more business processes included in the respective cluster. In some examples, the business process clustering model may assign a unique model AE ID to each of the final clusters and map the model AE ID to one or more BP IDs of the business processes included in the respective cluster. In the illustrated example of FIG. 4B, table 90 includes a column of BP IDs and a column of model AE IDs. As shown, the mapping of BP IDs to model AE IDs is a many-to-one mapping with BP IDs 1, 2 and 3 being mapped to model AE ID 1, and BP IDs 4, 5, and 6 being mapped to model AE ID 2. In this example, BP IDs 1-3 represent the business processes included in a first final cluster assigned model AE ID 1, and BP IDs 4-5 represent the business processes included in a second final cluster assigned AE ID 2.

FIGS. 5A-5D illustrate example user interface dashboards generated by an audit system, e.g., audit system 14 of FIG. 1, for display on one or more agent devices, e.g., agent devices 16 of FIG. 1, in accordance with the techniques of this disclosure. As discussed above, in some examples, model AEs 24, which are automatically assembled by business process clustering model 20 of audit system 14, may be used for credible challenges to agent AEs 26, which are manually assembled by the human agents. In the illustrated examples of FIGS. 5A-5D, the user interface dashboards present one or more reports generated by audit system 14 resulting from credible challenges to one or more agent AEs 26 based on one or more model AEs 24.

Figure 5A:
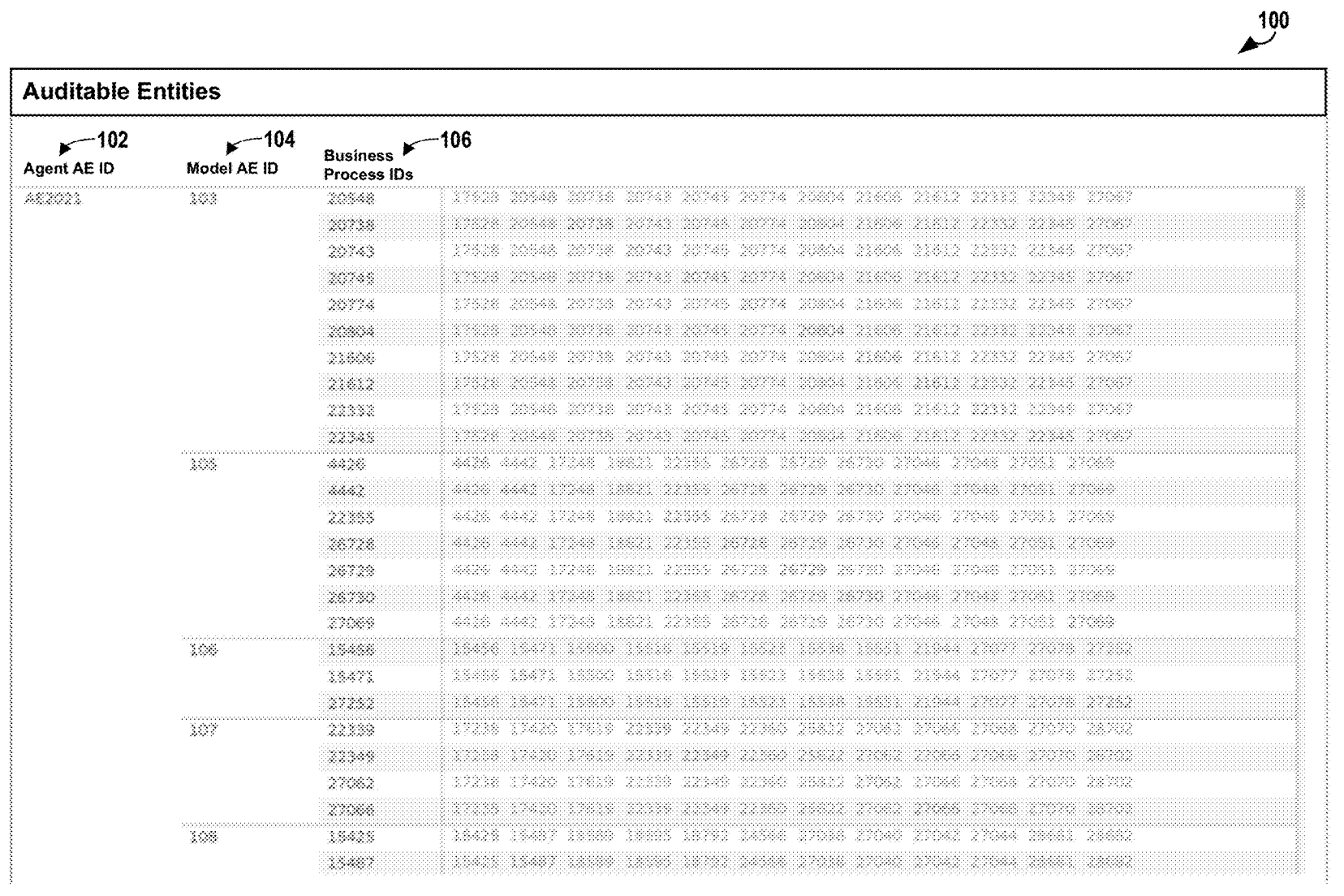

FIG. 5A illustrates an example user interface dashboard 100 that presents how business processes manually assembled into a single agent AE are automatically assembled into multiple agent AEs by business process clustering model 20. In the example of FIG. 5A, user interface dashboard 100 includes a tabular format having columns Agent AE ID 102, Model AE ID 104, and Business Process IDs 106. Dashboard 100 of FIG. 5A illustrates that agent AE ID "AE2021" includes twenty-six business process IDs, which are clustered into five distinct model AE IDs "103," "105," "106," "107," and "108." For example, model AE ID 103 includes ten business process IDs, model AE ID 105 includes seven business process IDs, model AE ID 106 includes three business process IDs, model AE ID 107 includes four business process IDs, and model AE ID 108 includes two business process IDs.

Figure 5B:
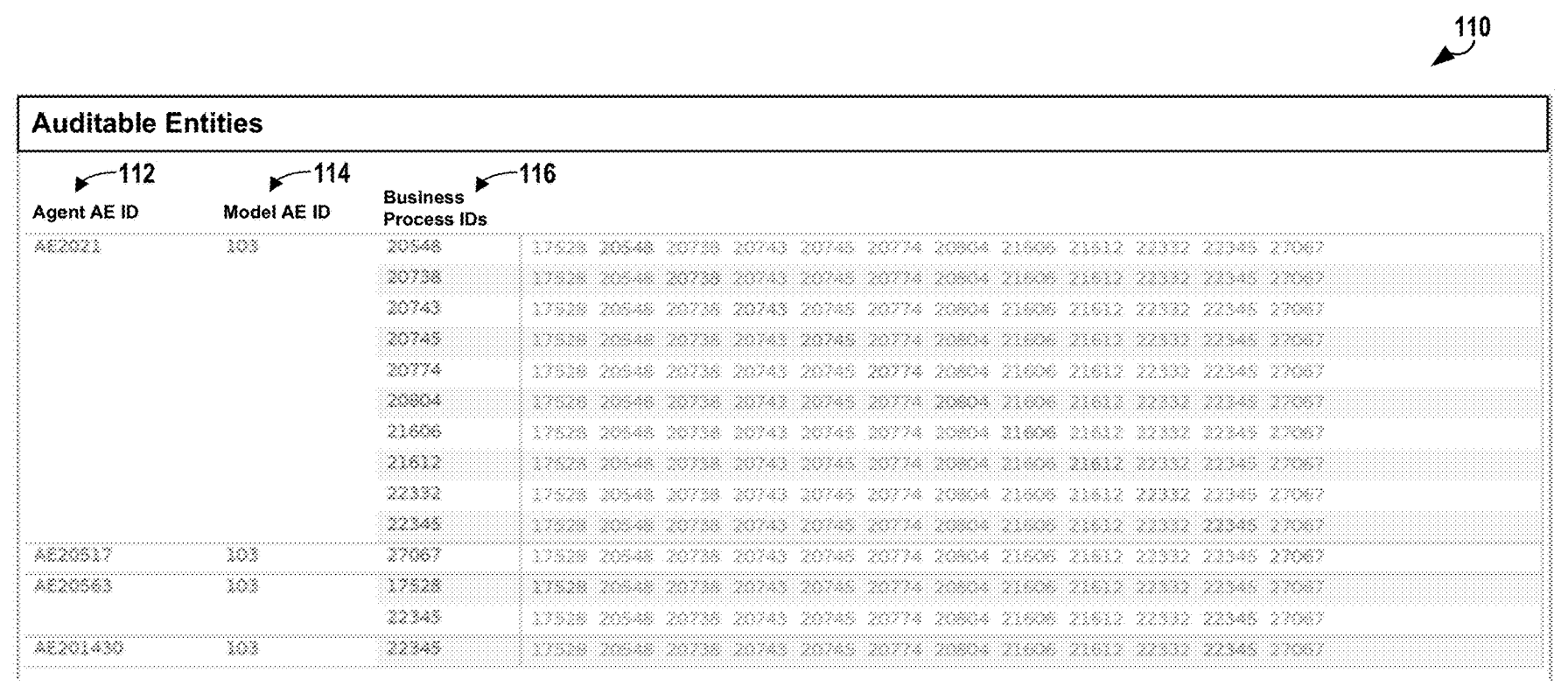

FIG. 5B illustrates an example user interface dashboard 110 that presents how business processes automatically assembled into a single model AE by business process clustering model 20 are manually included in multiple agent AEs. In the example of FIG. 5A, user interface dashboard 100 includes a tabular format having columns Agent AE ID 112, Model AE ID 114, and Business Process IDs 116. Dashboard 110 of FIG. 5B illustrates that model AE ID "103" includes twelve business process IDs, which are included in four different agent AE IDs "AE2021," "AE20517," "AE20563," and "AE201430." For example, ten of the business processes included in model AE ID 103 are included in agent AE ID AE2021 (as also illustrated in FIG. 5A), one of the business processes included in model AE ID 103 is included in agent AE ID AE20517, two of the business processes included in model AE ID 103 are included in agent AE ID AE20563 (one of which is also included in AE2021), and one of the business processes included in model AE ID 103 is included in agent AE ID AE201430 (which is also included in both AE2021 and AE20563).

Figure 5C:
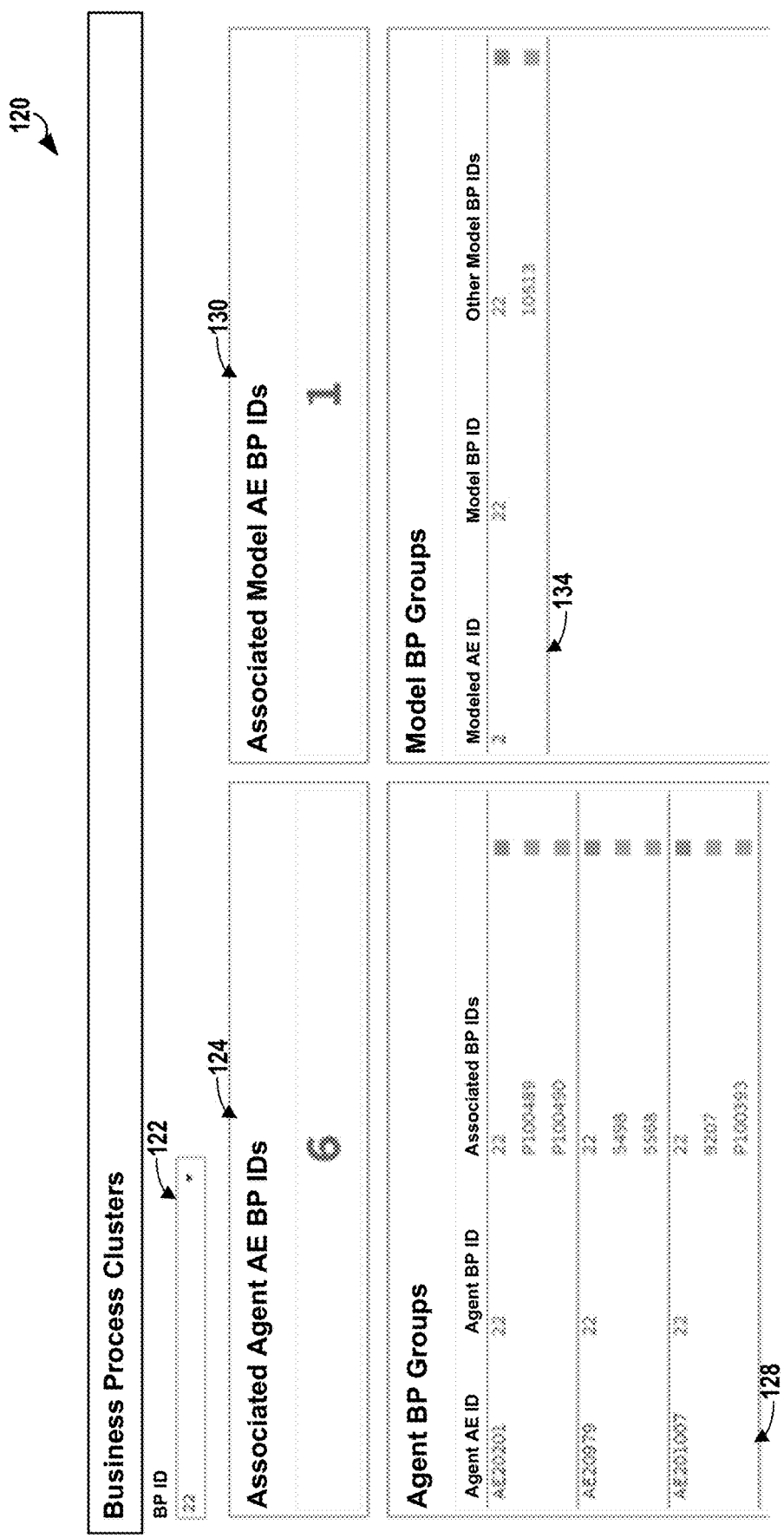

FIG. 5C illustrates an example user interface dashboard 120 that presents the agent AEs and the model AEs that include a single business process, and any associated business processes included in each of the AEs. User interface dashboard 120 includes a BP ID field 122 used to select a specific business process ID, an Associated Agent AE BP IDs region 124 that presents a number of associated business processes from any agent AEs that include the selected business process, and an Agent BP Groups region 128 that presents the Agent AE IDs that include the selected business process and the associated BP IDs within each of the Agent AE IDs. In addition, user interface dashboard 120 includes an Associated Model AE BP IDs region 130 that presents a number of associated business processes from any model AEs that include the selected business process, and a Model BP Groups region 134 that presents the Model AE IDs that include the selected business process and the associated BP IDs within each of the Model AE IDs.

In the illustrated example of FIG. 5C, BP ID "22" is entered in the business process ID field 122. Associated Agent AE BP IDs region 124 presents that selected BP ID 22 has "6" associated business processes from agent AEs that include selected BP ID 22. Agent BP Groups region 128 presents that selected BP ID 22 is included in three agent AEs (i.e., Agent AE IDs AE20201, AE20979, and AE201007) and that each of the agent AEs includes two associated BP IDs for a total of 6 associated BP IDs from the agent AEs for BP ID 22. Associated Model AE BP IDs region 130 presents that selected BP ID 22 has "1" associated business process from model AEs that include selected BP ID 22. Model BP Groups region 134 presents that selected BP ID 22 is included in one model AE (i.e., Model AE ID 2) and that the model AE includes one associated BP ID for BP ID 22.

Figure 5D:
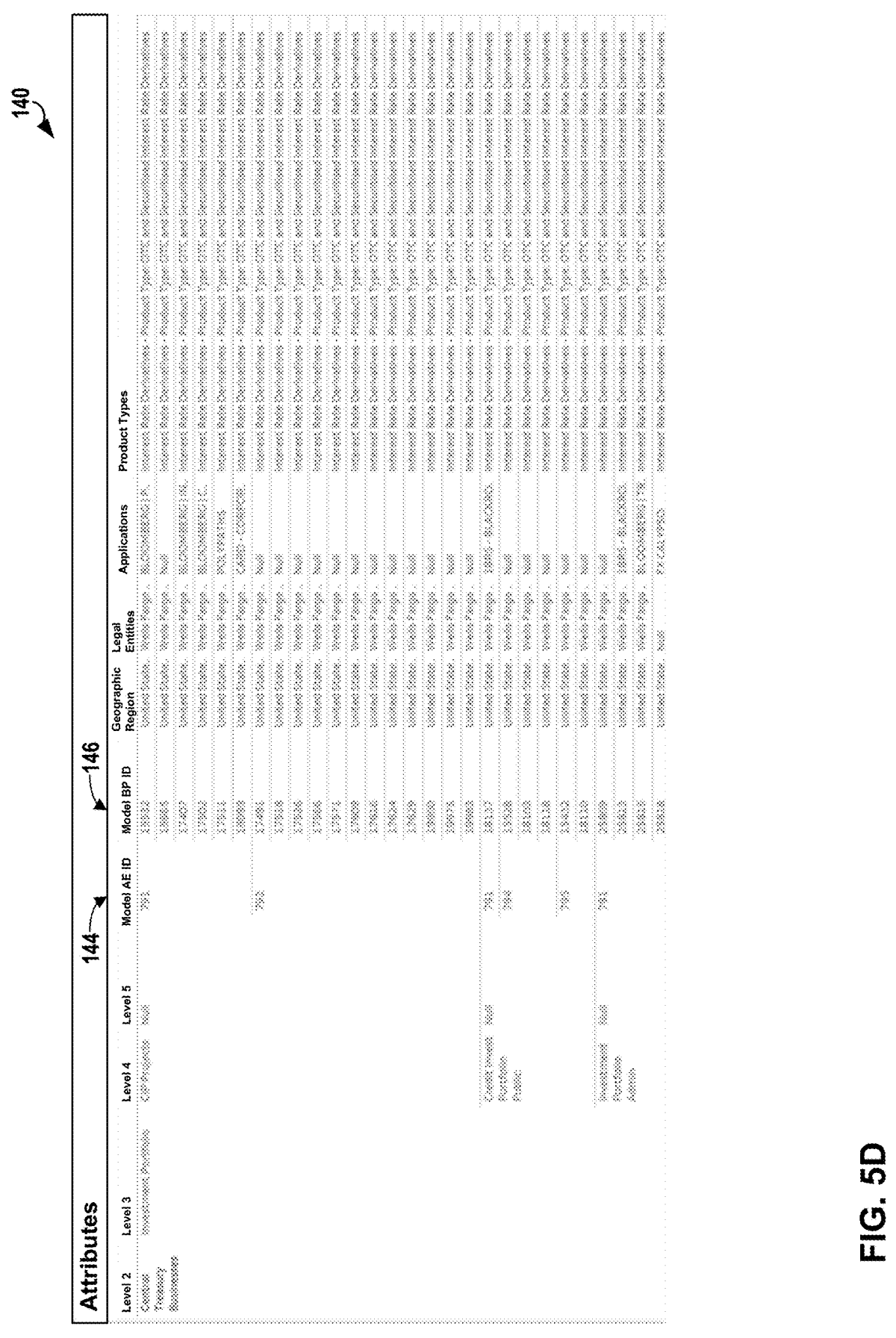

FIG. 5D illustrates an example user interface dashboard 140 that presents a view of all model AEs assembled by business process clustering model 20, including the associated business processes and their corresponding attributes for each of the model AEs. In the example of FIG. 5D, user interface dashboard 140 includes a tabular format having columns for the divisional hierarchy attributes of Level 2, Level 3, Level 4, and Level 5, Model AE ID 144, Model BP ID 146, the geographic region attribute, the legal entities attribute, the applications attribute, and the product types attribute.

In the illustrated example of FIG. 5D, user interface dashboard 140 presents four model AE IDs 791, 792, 794, and 795 that each include business processes from the same L2/L3 division of the company. The model AE IDs 791, 792, 794, and 795 may each include business processes having different L4 and L5 attributes. For example, as illustrated in FIG. 5D, model AE ID 791 includes business processes having three different L4 attributes. The model AE IDs may also each include business processes having different geographic region attributes, legal entities attributes, applications attributes, and product types attributes.

In some examples, the reports may illustrate the differences between how the business processes of a division are assembled into one or more model AEs 24, and how the same business processes were assembled into one more agent AEs 26. In other examples, the reports may illustrate a number of model AEs 24 that were created by business process clustering model 20 compared to a number of agent AEs 26 that were created for the same group of business processes of a division. In some examples, the agents may use the reports generated by user interface unit 20 to inform how to create and/or modify agent AEs 26 for their respective divisions.

Figure 6:
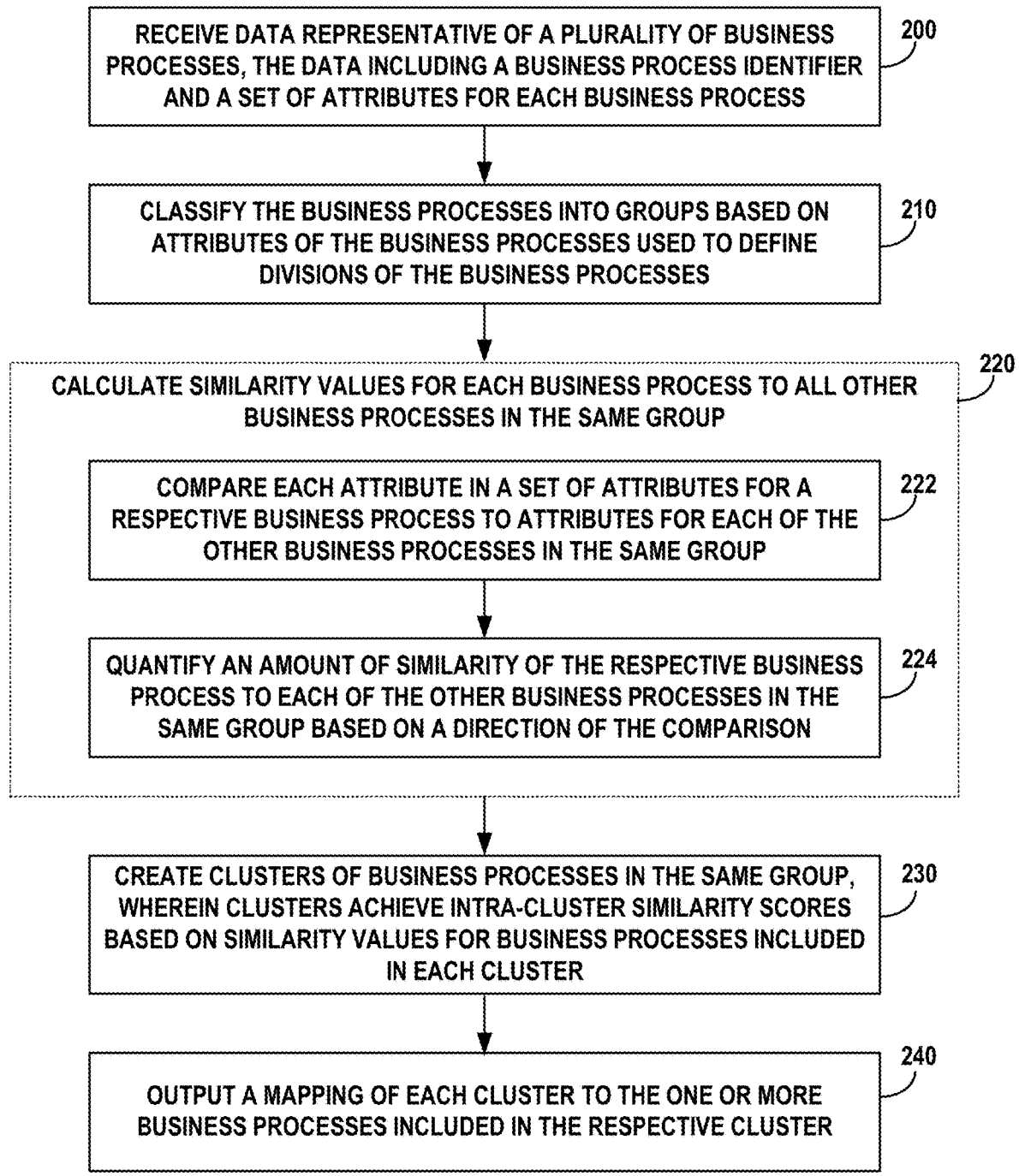
FIG. 6 is a flow diagram illustrating an example operation of automatically clustering business processes to create model AEs, in accordance with techniques of this disclosure.

FIG. 6 is a flow diagram illustrating an example operation of automatically clustering business processes to create model AEs, in accordance with techniques of this disclosure. The example operation of FIG. 6 is described herein with respect to audit system 14 of FIG. 1 while interacting with other components and devices of company network 12. In other examples, the example operation of FIG. 6 may be performed by audit system 30 of FIG. 2.

Audit system 14 receives data representative of a plurality of business processes from business process database 18, the data including a business process identifier and a set of attributes for each business process (200). The set of attributes for each business process includes one or more of divisional hierarchy levels used to define a division of the respective business process, legal entities encompassed by the respective business process, applications encompassed by the respective business process, types of products encompassed by the respective business process, or geographic regions in which the respective business process is utilized. In one example, as described above with respect to FIG. 4A, business process database 18 may comprise a relational database. In that example, audit system 14 may query the attributes for the plurality of business processes from the relational database based on a shared business process ID for each business process of the plurality of business processes.

In some examples, the received attributes may be in the form of strings. Business process clustering model 20 may pre-process the strings to remove formatting discrepancies, such as capitalization and spacing discrepancies. Business process clustering model 20 then factorizes each attribute in the set of attributes for each business process of the plurality of business processes such that unique values of attributes are converted to unique attribute strings. The attribute-level factorization enables attribute-level similarity comparisons, instead of attribute list-level similarity comparisons.

Business process clustering model 20 classifies the business processes into one or more groups based on the divisional hierarchy attributes of the business processes used to define divisions of the business processes (210). In this way, each group includes business processes associated with a respective division. For each group, business process clustering model 20 then calculates similarity values for each business process to all other business processes within the same group (220). Business process clustering model 20 may store the similarity values calculated for each business process in the same group as a bi-directional similarity matrix for the group, e.g., in similarity matrices 48 of FIG. 2.

In order to calculate the similarity values for a respective business process, business process clustering model 20, compares each attribute in the set of attributes for the respective business process to attributes for each of the other business processes in the same group (222). Business process clustering model 20 then quantifies an amount of similarity of the respective business process to each of the other business processes in the same group based on a direction of the comparison (224). In some scenarios, each type of attribute of the business processes has an associated weighted significance. In those scenarios, business process clustering model 20 quantifies the amount of similarity of the respective business process to each of the other business processes based on the direction of the comparison and further based on the weighted significance of each type of attribute included in the set of attributes for the respective business process.

As one example, business process clustering model 20 calculates similarity values for a first business process to a second business process within the same group by comparing each attribute in a first set of attributes for the first business process to each attribute in a second set of attributes for the second business process in a first direction from the first business process to the second business process. Based on the comparison in the first direction, business process clustering model 20 calculates a first similarity percentage of attributes in the first set of attributes for the first business process that are represented by a same attribute string as attributes in the second set of attributes for the second business process. Business process clustering model 20 further calculates a first similarity value in the first direction based on the similarity percentage and, in some examples, the weighted significance of each type of attribute included in the first set of attributes for the first business process. Business process clustering model 20 next compares each attribute in the second set of attributes for the second business process to each attribute in the first set of attributes for the first business process in a second direction from the second business process to the first business process. Based on the comparison in the second direction, business process clustering model 20 calculates a second similarity percentage of attributes in the second set of attributes for the second business process that are represented by a same attribute string as attributes in the first set of attributes for the first business process. Business process clustering model 20 then calculates a second similarity value in the second direction based on the second similarity percentage and, in some examples, the weighted significance of each type of attribute included in the first set of attributes for the first business process.

After generating the bi-directional similarity matrix for each group, business process clustering model 20 creates clusters of business processes from within the same group, wherein the clusters achieve intra-cluster similarity scores based on the similarity values for the one or more business processes included in each cluster (230). Business process clustering model 20 outputs a mapping of each cluster of the one or more clusters to the one or more business processes included in the respective cluster (240). For example, as described above with respect to FIG. 4A, business process clustering model 20 may assign a unique model AE ID to each cluster, and output a table mapping the unique AE ID for each cluster to one or more business process identifiers IDs of the one or more business processes included in the respective cluster.

The clusters of business processes from the same group are associated with a particular division of a company. In some examples, each cluster for the same group comprises a model AE 24 for use as a functional unit for vertical internal audits of the one or more business processes included in the respective cluster for the particular division of the company. In other examples, the clusters for the same group comprise model AEs 24 for use as the basis for credible challenges to one or more agent AEs 26 associated with the particular division of the company, wherein agent AEs 26 are manually assembled by human agents of the company. User interface unit 22 may perform comparisons between model AEs 24 and agent AEs 26 associated with the particular division. User interface unit 22 may further generate one or more reports based on the comparisons, and send data representative of user interface dashboards (examples of which are illustrated in FIGS. 5A-5D) to one or more agent devices 16 to present the one or more reports to the human agents.

Figure 7:
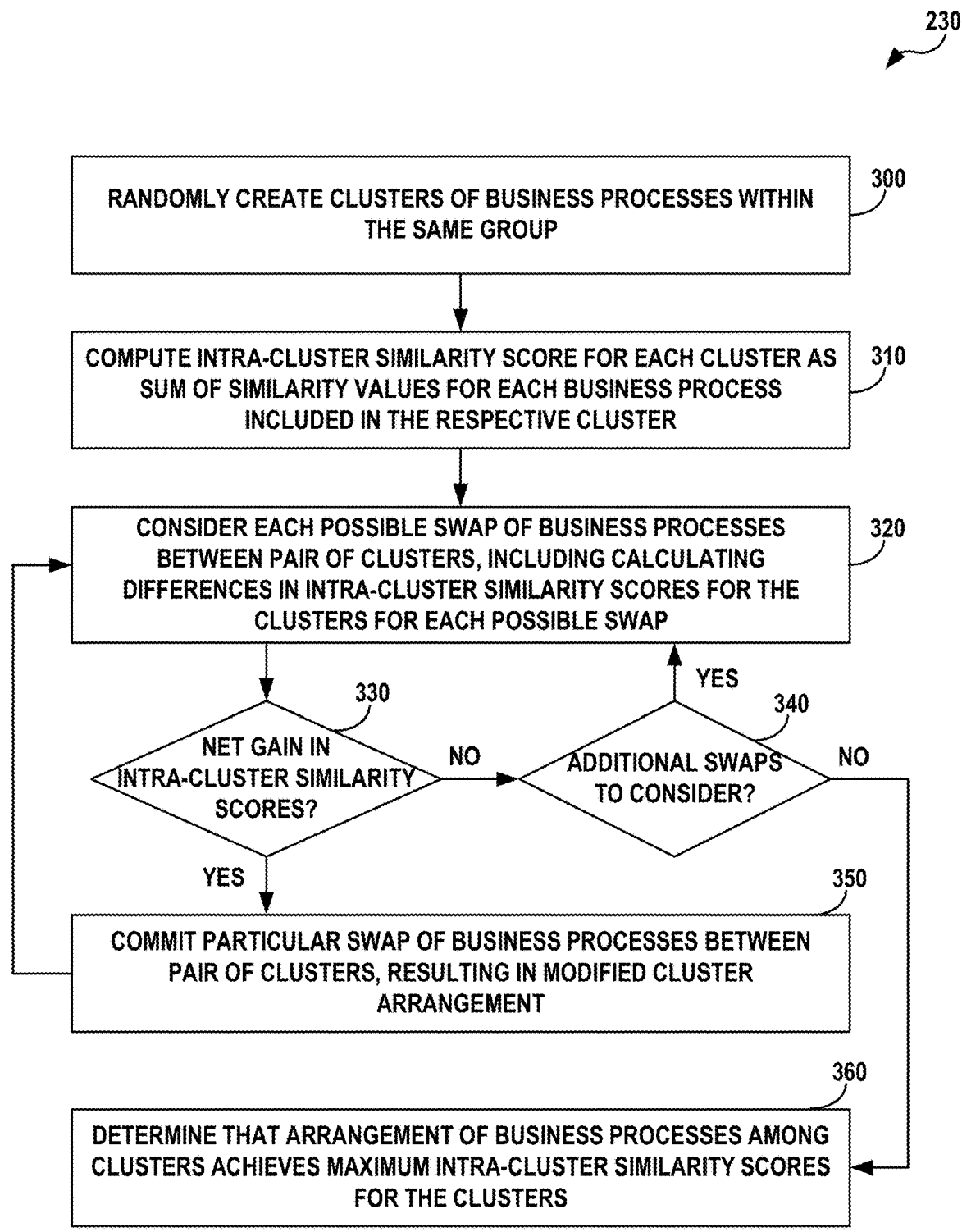
FIG. 7 is a flow diagram illustrating an example operation of creating clusters that achieve maximum intra-cluster similarity scores, in accordance with techniques of this disclosure.

FIG. 7 is a flow diagram illustrating an example operation of creating clusters that achieve maximum intra-cluster similarity scores (as an example of step 230 of FIG. 6), in accordance with techniques of this disclosure. After generating the bi-directional similarity matrix for each group, business process clustering model 20 randomly creates clusters of business processes in the same group (300). The clusters may be formed such that each cluster includes up to a preset number (e.g., N=12) of randomly selected business processes. Business process clustering model 20 computes an intra-cluster similarity score for each cluster as a sum of the similarity values for each business process included in the respective cluster (310).

Business process clustering model 20 iteratively determines an arrangement of business processes among the clusters that achieves maximum intra-cluster similarity scores for the clusters. More specifically, business process clustering model 20 considers each possible swap of business processes between a pair of clusters (i.e., a first cluster and a second cluster), including calculating differences in a first intra-cluster similarity score for the first cluster and differences in a second intra-cluster similarity score for the second cluster for each possible swap of business processes between the first cluster and the second cluster (320). If, for a particular swap, the difference in the first intra-cluster similarity score for the first cluster and the difference in the second intra-cluster similarity score for the second cluster results in a net gain to the intra-cluster similarity scores for the pair of clusters (YES branch of 330), business process clustering model 20 commits the particular swap of business processes between the first cluster and the second cluster (350). Business process clustering model 20 then re-considers each possible swap of business processes between the pair of clusters based on the modified cluster arrangement (320).

If, for the particular swap, the difference in the first intra-cluster similarity score for the first cluster and the difference in the second intra-cluster similarity score for the second cluster does not result in a net gain to the intra-cluster similarity scores for the pair of clusters (NO branch of 330), business process clustering model 20 determines whether there are additional swaps between the first and second clusters to consider or if there are swamps between other pairs of clusters in the same group to consider (340). If there are additional swaps to consider based on the current cluster arrangement (YES branch of 340), business process clustering model 20 considers the additional swaps between the different pairs of clusters (320).

Once business process clustering model 20 identifies no additional swap of business processes between the pair of clusters that results in a net gain to the intra-cluster similarity scores for the pair of clusters (NO branch of 330) and determines that there are no additional swaps to consider based on the current cluster arrangement (NO branch of 340), business process clustering model 20 determines that the current cluster arrangement of business processes among the clusters in the same group is the final cluster arrangement that achieves maximum intra-cluster similarity scores for the clusters in the same group (360). As described in detail above, the clusters in the final cluster arrangement may be considered model AEs for use in performing and planning vertical internal audits of the business processes included in each of the clusters for the group associated with a particular division of a company.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include random access memory (RAM), read-only memory (ROM), electrically erasable programmable ROM (EEPROM), compact disc ROM (CD-ROM) or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application-specific integrated circuits (ASICs), field-programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   modifying, by one or more agent devices, data representative of a plurality of business processes stored in a database, the data including a business process identifier and a set of attributes for each business process of the plurality of business processes, wherein the database comprises a relational database including a collection of tables, each table storing a different attribute of the set of attributes for each business process and related to the other tables in the collection of tables based on the business process identifier for each business process;
   receiving, by a computing system and from the database, the data representative of the plurality of business processes;
   calculating, by the computing system, similarity values for each business process to all other business processes, wherein calculating the similarity values for a respective business process comprises:
      comparing each attribute in the set of attributes for the respective business process to attributes for each of the other business processes, and
      quantifying an amount of similarity of the respective business process to each of the other business processes based on a direction of the comparison;
   creating, by the computing system, clusters of business processes, each cluster including one or more business processes, wherein the clusters achieve intra-cluster similarity scores based on the similarity values for the one or more business processes included in each cluster, wherein creating the clusters of business processes comprises:
      randomly creating clusters of business processes, each cluster including one or more randomly selected business processes,
      computing an intra-cluster similarity score for each cluster as a sum of the similarity values for each business process included in the respective cluster, and
      iteratively determining an arrangement of business processes among the clusters that achieves maximum intra-cluster similarity scores for the clusters; and
   outputting, by the computing system, a mapping of each cluster of the one or more clusters to the one or more business processes included in the respective cluster.

2. The method of claim 1, where the set of attributes for each business process includes one or more of divisional hierarchy levels used to define a division of the respective business process, legal entities encompassed by the respective business process, applications encompassed by the respective business process, types of products encompassed by the respective business process, or geographic regions in which the respective business process is utilized.

3. The method of claim 1, wherein each type of attribute has an associated weighted significance, and wherein quantifying the amount of similarity of the respective business process to each of the other business processes is further based on the weighted significance of each type of attribute included in the set of attributes for the respective business process.

4. The method of claim 1, wherein receiving the data representative of the plurality of business processes comprises querying attributes for the plurality of business processes from the relational database based on business process identifiers of the plurality of business processes.

5. The method of claim 1, further comprising storing the similarity values calculated for each business process in a bi-directional similarity matrix.

6. The method of claim 1, further comprising factorizing, by the computing system, each attribute in the set of attributes for each business process of the plurality of business processes such that unique values of attributes are converted to unique attribute strings.

7. The method of claim 6, wherein calculating similarity values for a first business process to a second business process comprises:
   comparing each attribute in a first set of attributes for the first business process to each attribute in a second set of attributes for the second business process in a first direction from the first business process to the second business process;
   based on the comparison in the first direction, calculating a first similarity percentage of attributes in the first set of attributes for the first business process that are represented by a same attribute string as attributes in the second set of attributes for the second business process;
   calculating a first similarity value in the first direction based on the similarity percentage;
   comparing each attribute in the second set of attributes for the second business process to each attribute in the first set of attributes for the first business process in a second direction from the second business process to the first business process;
   based on the comparison in the second direction, calculating a second similarity percentage of attributes in the second set of attributes for the second business process that are represented by a same attribute string as attributes in the first set of attributes for the first business process; and
   calculating a second similarity value in the second direction based on the second similarity percentage.

8. The method of claim 1, further comprising classifying, by the computing system, the business processes into one or more groups based on one or more attributes of the business processes used to define divisions of the business processes, wherein each group of the one or more groups includes business processes associated with a respective division,
   wherein calculating the similarity values for each business process comprises calculating the similarity values for each business process to all other business processes from within a same group, and
   wherein creating the clusters of business processes comprises creating the clusters of business processes from within the same group such that the clusters achieve maximum intra-cluster similarity scores within the same group.

9. The method of claim 1, wherein iteratively determining the arrangement of business processes among the clusters comprises:
   considering each possible swap of business processes between a first cluster and a second cluster, including calculating differences in a first intra-cluster similarity score for the first cluster and differences in a second intra-cluster similarity score for the second cluster for each possible swap of business processes between the first cluster and the second cluster;
   committing a particular swap of business processes between the first cluster and the second cluster based on the difference in the first intra-cluster similarity score for the first cluster and the difference in the second intra-cluster similarity score for the second cluster resulting in a net gain to the intra-cluster similarity scores for the first cluster and the second cluster;
   in response to committing the particular swap of business processes, considering each new possible swap of business processes between the first cluster and the second cluster; and
   based on identifying no additional swap of business processes between the first cluster and the second cluster resulting in another net gain to the intra-cluster similarity scores for the first cluster and the second cluster, determining that the arrangement of business processes among the first cluster and the second cluster achieves maximum intra-cluster similarity scores for the first cluster and the second cluster.

10. The method of claim 1, wherein outputting the mapping comprises:
    assigning a unique model auditable entity identifier to each cluster; and
    outputting a mapping of the unique auditable entity identifier for each cluster to one or more business process identifiers of the one or more business processes included in the respective cluster.

11. The method of claim 1, wherein the clusters are associated with a particular division of a company, and wherein each cluster comprises a model auditable entity for use as a functional unit for vertical internal audits of the one or more business processes included in the respective cluster for the particular division of the company.

12. The method of claim 1, wherein the clusters are associated with a particular division of a company, and wherein the clusters comprise model auditable entities for use as the basis for credible challenges to one or more agent auditable entities associated with the particular division of the company, wherein the agent auditable entities are manually assembled by human agents of the company.

13. The method of claim 12, further comprising:
    performing, by the computing system, comparisons between the model auditable entities and the agent auditable entities associated with the particular division;
    generating, by the computing system, one or more reports based on the comparisons; and
    sending, by the computing system and to the one or more agent devices, data representative of user interface dashboards used to present the one or more reports to the human agents.

14. A system comprising:
    a database configured to store data representative of a plurality of business processes, the data including a business process identifier and a set of attributes for each business process of the plurality of business processes, wherein the database comprises a relational database including a collection of tables, each table storing a different attribute of the set of attributes for each business process and related to the other tables in the collection of tables based on the business process identifier for each business process; and a computing system comprising a memory and one or more processors in communication with the memory and configured to:
  receive, from the database, the data representative of the plurality of business processes;
  calculate similarity values for each business process to all other business processes, wherein to calculate the similarity values for a respective business process, the one or more processors are configured to:
    compare each attribute in the set of attributes for the respective business process to attributes for each of the other business processes, and
    quantify an amount of similarity of the respective business process to each of the other business processes based on a direction of the comparison;
  create clusters of business processes, each cluster including one or more business processes, wherein the clusters achieve intra-cluster similarity scores based on the similarity values for the one or more business processes included in each cluster, wherein to create the clusters of business processes, the one or more processors are configured to:
    randomly create clusters of business processes, each cluster including one or more randomly selected business processes,
    compute an intra-cluster similarity score for each cluster as a sum of the similarity values for each business process included in the respective cluster, and
    iteratively determine an arrangement of business processes among the clusters that achieves maximum intra-cluster similarity scores for the clusters; and
  output a mapping of each cluster of the one or more clusters to the one or more business processes included in the respective cluster.

15. The system of claim 14, wherein each type of attribute has an associated weighted significance, and wherein to quantify the amount of similarity of the respective business process to each of the other business processes, the one or more processors of the computing system are configured to quantify the amount of similar further based on the weighted significance of each type of attribute included in the set of attributes for the respective business process.

16. The system of claim 14, wherein the one or more processors of the computing system are configured to factorize each attribute in the set of attributes for each business process of the plurality of business processes such that unique values of attributes are converted to unique attribute strings.

17. The system of claim 14, wherein the one or more processors of the computing system are configured to classify the business processes into one or more groups based on one or more attributes of the business processes used to define divisions of the business processes, wherein each group of the one or more groups includes business processes associated with a respective division, wherein to calculate the similarity values for each business process, the one or more processors are configured to calculate the similarity values for each business process to all other business processes from within a same group, and wherein to create the clusters of business processes, the one or more processors are configured to create the clusters of business processes from within the same group such that the clusters achieve maximum intra-cluster similarity scores within the same group.

18. A computer-readable storage medium storing instructions that, when executed, cause one or more programmable processors to:
  modify data representative of a plurality of business processes stored in a database, the data including a business process identifier and a set of attributes for each business process of the plurality of business processes, wherein the database comprises a relational database including a collection of tables, each table storing a different attribute of the set of attributes for each business process and related to the other tables in the collection of tables based on the business process identifier for each business process;
  receive, from the database, data representative of the plurality of business processes;
  calculate similarity values for each business process to all other business processes, wherein to calculate the similarity values for a respective business process, the instructions cause the one or more programmable processors to:
    compare each attribute in the set of attributes for the respective business process to attributes for each of the other business processes, and
    quantify an amount of similarity of the respective business process to each of the other business processes based on a direction of the comparison;
  create clusters of business processes, each cluster including one or more business processes, wherein the clusters achieve intra-cluster similarity scores based on the similarity values for the one or more business processes included in each cluster, wherein to create the clusters of business processes the instructions cause the one or more programmable processors to:
    randomly create clusters of business processes, each cluster including one or more randomly selected business processes,
    compute an intra-cluster similarity score for each cluster as a sum of the similarity values for each business process included in the respective cluster, and
    iteratively determine an arrangement of business processes among the clusters that achieves maximum intra-cluster similarity scores for the clusters; and
  output a mapping of each cluster of the one or more clusters to the one or more business processes included in the respective cluster.

* * * * *